(12) United States Patent
Li et al.

(10) Patent No.: US 10,671,909 B2
(45) Date of Patent: Jun. 2, 2020

(54) DECREASING NEURAL NETWORK INFERENCE TIMES USING SOFTMAX APPROXIMATION

(71) Applicant: Google LLC, Mountain View, CA (US)

(72) Inventors: Yang Li, Palo Alto, CA (US); Sanjiv Kumar, Jericho, NY (US); Pei-Hung Chen, Los Angeles, CA (US); Si Si, San Jose, CA (US); Cho-Jui Hsieh, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/586,702

(22) Filed: Sep. 27, 2019

(65) Prior Publication Data

US 2020/0104686 A1    Apr. 2, 2020

Related U.S. Application Data

(60) Provisional application No. 62/737,909, filed on Sep. 27, 2018.

(51) Int. Cl.
*G06N 3/04* (2006.01)
*G06F 17/16* (2006.01)
*G06F 17/18* (2006.01)
*G06K 9/62* (2006.01)

(52) U.S. Cl.
CPC ......... *G06N 3/0472* (2013.01); *G06F 17/16* (2013.01); *G06F 17/18* (2013.01); *G06K 9/6218* (2013.01)

(58) Field of Classification Search
None
See application file for complete search history.

(56) References Cited

U.S. PATENT DOCUMENTS

2018/0336183 A1* 11/2018 Lee ..................... G06F 40/30

OTHER PUBLICATIONS

Malkov, Yury A., and Dmitry A. Yashunin. "Efficient and robust approximate nearest neighbor search using hierarchical navigable small world graphs." IEEE transactions on pattern analysis and machine intelligence (2018). (Year: 2018).*

(Continued)

*Primary Examiner* — Daniel T Pellett
(74) *Attorney, Agent, or Firm* — Fish & Richardson P.C.

(57) ABSTRACT

Methods, systems, and apparatus, including computer programs encoded on computer storage media, for decreasing neural network inference times using softmax approximation. One of the methods includes maintaining data specifying a respective softmax weight vector for each output in a vocabulary of possible neural network outputs; receiving a neural network input; processing the neural network input using one or more initial neural network layers to generate a context vector for the neural network input; and generating an approximate score distribution over the vocabulary of possible neural network outputs for the neural network input, comprising: processing the context vector using a screening model configured to predict a proper subset of the vocabulary for the context input; and generating a respective logit for each output that is in the proper subset, comprising applying the softmax weight vector for the output to the context vector.

20 Claims, 5 Drawing Sheets

(56) References Cited

OTHER PUBLICATIONS

Lee, Shi-wook, Kazuyo Tanaka, and Yoshiaki Itoh. "Empirical Analysis of Score Fusion Application to Combined Neural Networks for Open Vocabulary Spoken Term Detection." Interspeech. 2018. (Year: 2018).*
Maas, Andrew L., et al. "Increasing deep neural network acoustic model size for large vocabulary continuous speech recognition." arXiv preprint arXiv:1406.7806 (2014). (Year: 2014).*
Bachrach et al, "Speeding up the xbox recommender system using a euclidean transformation for inner-product spaces" Proceedings of the 8th ACM Conference on Recommender systems, Oct. 2014, 8 pages.
Boytsov et al, "Engineering efficient and effective non-metric space library" Similarity Search and Applications—6th International Conference, Oct. 2013, 14 pages.
Cettolo et al, "Report on the 11th iwslt evaluation campaign" Proceedings of the International Workshop on Spoken Language Translation, Dec. 2014, 16 pages.
Grave et al, "Efficient softmax approximation for gpus" arXiv, Jun. 2017, 9 pages.
Guo et al, "Quantization based fast inner product search" arXiv, Sep. 2015, 17 pages.
Indyk et al, "Approximate nearest neighbors: towards removing the curse of dimensionality" Proceedings of the thirtieth annual ACM symposium on Theory of computing, May 1998, 10 pages.
Jang et al, "Categorical reparametrization with gumble-softmax" arXiv, Aug. 2017, 13 pages.
Jean et al, "On using very large target vocabulary for neural machine translation" arXiv, Mar. 2015, 10 pages.
Klein et al, "Opennmt: Open-source toolkit for neural machine translation" arXiv, Mar. 2017, 6 pages.
Li et al, "Deep reinforcement learning for dialogue generation" arXiv, Sep. 2016, 11 pages.
Luong et al., "Stanford neural machine translation systems for spoken language domain," Proceedings of the International Workshop on Spoken Language Translation, Dec. 2015, 4 pages.
Malkov et al, "Approximate nearest neighbor algorithm based navigable small world graphs" Information Systems, Sep. 2014, 14 pages.
Marcus et al, "Building a large annotated corpus of english: the penn treebank" Association for Computational Linguistics, Jun. 1993, 18 pages.
Merity et al., "Pointer sentinel mixture models," arXiv, Sep. 2016, 13 pages.
Minh et al, "A fast and simple algorithm for training neural probabilistic language models" arXiv, Jun. 2012, 8 pages.
Morin et al, "Hierarchical probabilistic neural network language model" Citeseer, Jan. 2005, 7 pages.
Neyshabur et al, "On symmetric and asymmetric lshs for inner product search," arXiv, Jun. 2015, 11 pages.
Rush et al., "A neural attention model for abstractive sentence summarization," arXiv, Sep. 2015, 11 pages.
Shim et al, "Svd-softmax: Fast softmax approximation on large vocabulary neural networks" NIPS, Dec. 2017, 11 pages.
Shrivastava et al, "Asymmetric lsh (alsh) for sublinear time maximum inner product search" NIPS, Dec. 2014, 9 pages.
Sproull, "Refinements to nearest-neighbor searching ink-dimensional trees" Algorithmica, Jun. 1991, 11 pages.
Sutskever et al, "Sequence to sequence learning with neural networks" Dec. 2014, 9 pages.
Wu et al, "Multiscale quantization for fast similarity search" Advances in Neural Information Processing Systems, Dec. 2017, 11 pages.
Yu et al, "A greedy approach for budgeted maximum inner product search" Advances in Neural Information Processing Systems, Dec. 2017, 10 pages.
Zhang et al, "Navigating with graph representations for fast and scalable decoding of neural language models" arXiv, Jun. 2018, 15 pages.

* cited by examiner

| | PTB-Small | | | PTB-Large | | | NMT: DE-EN | | |
|---|---|---|---|---|---|---|---|---|---|
| | Speedup | P@1 | P@5 | Speedup | P@1 | P@5 | Speedup | P@1 | P@5 |
| L2S (Our Method) | 10.6x | 0.998 | 0.990 | 45.3x | 0.996 | 0.982 | 20.4x | 0.989 | 0.993 |
| FGD | 1.3x | 0.980 | 0.989 | 6.9x | 0.975 | 0.979 | 6.7x | 0.987 | 0.981 |
| SVD-softmax | 0.8x | 0.987 | 0.99 | 2.3x | 0.988 | 0.981 | 3.4x | 0.98 | 0.985 |
| Adaptive-softmax | 1.9x | 0.972 | 0.981 | 4.2x | 0.974 | 0.997 | 3.2x | 0.982 | 0.984 |
| Greedy-MIPS | 0.5x | 0.998 | 0.972 | 1.8x | 0.945 | 0.903 | 2.6x | 0.911 | 0.887 |
| PCA-MIPS | 0.14x | 0.322 | 0.341 | 0.5x | 0.361 | 0.326 | 1.3x | 0.379 | 0.320 |
| LSH-MIPS | 1.3x | 0.165 | 0.33 | 2.2x | 0.353 | 0.31 | 1.6x | 0.131 | 0.137 |

FIG. 5

DECREASING NEURAL NETWORK INFERENCE TIMES USING SOFTMAX APPROXIMATION

CROSS-REFERENCE TO RELATED APPLICATION

This application claims priority under 35 U.S.C. 119 to Provisional Application No. 62/737,909, filed Sep. 27, 2018, which is incorporated by reference.

BACKGROUND

This specification relates to processing inputs using a neural network.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that implements a neural network that replaces a conventional softmax output layer with an accurate approximation of the softmax layer that can be computed using much less computation and in much less time. This greatly decreases the time required for the described system to compute a neural network inference for a given input relative to conventional systems.

In particular, the system maintains data specifying a respective softmax weight vector (and optionally a respective bias value) for each output in a vocabulary of possible neural network outputs. Which outputs are in the vocabulary of possible neural networks output is dependent on the task that the neural network is configured to perform.

For example, when the task is machine translation, the vocabulary includes words in a target language. In other words, when the task is machine translation, the input to the system is text in a source language and the output of the system is text in another language.

As another example, the task can be another type of natural language generation task that uses a vocabulary of possible network outputs that are words in a natural language. One example of such a task is text summarization, where the system receives an input text sequence and generates an output text sequence that summarizes the input text sequence in fewer words. Another example of such a task is text paraphrasing, where the system receives an input text sequence and generates an output text sequence that has similar meaning to the input text sequence but uses different words from the input text sequence. Another example of such a task is image captioning, where the system receives an input image and generates an output text sequence that describes the content of the input image. Another example of such a task is question answering, where the system receives an input text sequence and generates an output text sequence that is an answer to a question posed in the input text sequence. Another example of such a task is language modelling, where the system receives an input text sequence and generates as output one or more words that are likely to follow the last word in the input text sequence. Generally, the system can perform any natural language generation task, i.e., any task in which the system generates a sequence of text conditioned on some input, which can be textual or data of a different type.

When the task is speech recognition, i.e., to convert input audio data into text, the vocabulary can include one or more of phonemes, characters, or words in a target natural language alphabet.

When the task is image classification, i.e., to classify an input image as belonging to one of a set of object categories, the vocabulary can include a set of object categories.

Generally, the described techniques are applicable to any machine learning task that has a large vocabulary of possible outputs. As described below, when the size of the vocabulary is large and the neural network needs to produce a probability distribution over the outputs in order to generate a network output, neural network inference times are bottlenecked by the computations of the softmax layer.

To compute an inference, the system receives a neural network input and processes the neural network input using one or more initial neural network layers to generate a context vector for the neural network input. As above, which neural network layers are part of the neural network is dependent on the task. For example, for sequence processing tasks, the layers can include one or more of recurrent layers, e.g. LSTM layers, feed-forward layers, self-attention layers, or convolutional layers. The context vector will generally be the output of the last initial neural network layer or a combination of outputs from multiple initial neural network layers, e.g., if the neural network includes skip connections.

The system generates an approximate score distribution over the vocabulary of possible neural network outputs for the neural network input, i.e., instead of generating an actual softmax score distribution by processing the context vector through a conventional softmax layer.

To generate the approximate distribution, the system processes the context vector using a screening model configured to predict a proper subset, i.e., less than all, of the vocabulary for the context input.

The system then generates a respective logit for each output that is in the proper subset by applying the softmax weight vector for the output to the context vector (and then optionally applying the bias value for the output). In some cases, the system uses these logits as the scores in the score distribution (and assigns each output that is not in the proper subset a score of zero). In other cases, the system normalizes the logits to generate a respective probability for each output that is in the proper subset (and assigns each output that is not in the proper subset a probability of zero).

Each proper subset is generally small relative to the whole vocabulary. Thus, to compute the approximate distribution, the system only needs to perform a small number of inner products instead of computing a different inner product for each output in the vocabulary, as would be required for a conventional softmax.

Particular embodiments of the subject matter described in this specification can be implemented so as to realize one or more of the following advantages.

Many neural networks are made up of a set of initial layers that receive an input and generate an initial output (referred to in this specification as a "context vector") and then a softmax layer that receives the context vector generated by the initial layers and generates a probability distribution over a vocabulary of outputs. The neural network then outputs the top k outputs in the vocabulary according to the probabilities or logits generated by the softmax layer or the top k probabilities or logits themselves. Thus, the softmax layer generates a logit for each output in the vocabulary and in some cases then normalizes the logits to generate probabilities. Generating a logit for an output requires multiplying the context vector by a weight vector corresponding to the logit, i.e., computing an inner product between two vectors, and then adding a bias value corresponding to the logit. When there are a large number of possible outputs, performing this computation can be a large bottleneck in computing neural network inferences. In fact, needing to perform the processing of the softmax layer can delay the overall inference speed to such a degree that the neural network cannot be implemented on a mobile device. The described techniques, on the other hand, use a lightweight screening model to accurately approximate the outputs of the softmax with much fewer computation that would otherwise be required. This drastically decreases the time and computational resources required to perform an inference using the neural network and allows the neural network to efficiently be deployed in resource-constrained environments where outputs need to be generated in close to real-time, e.g., on mobile devices.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
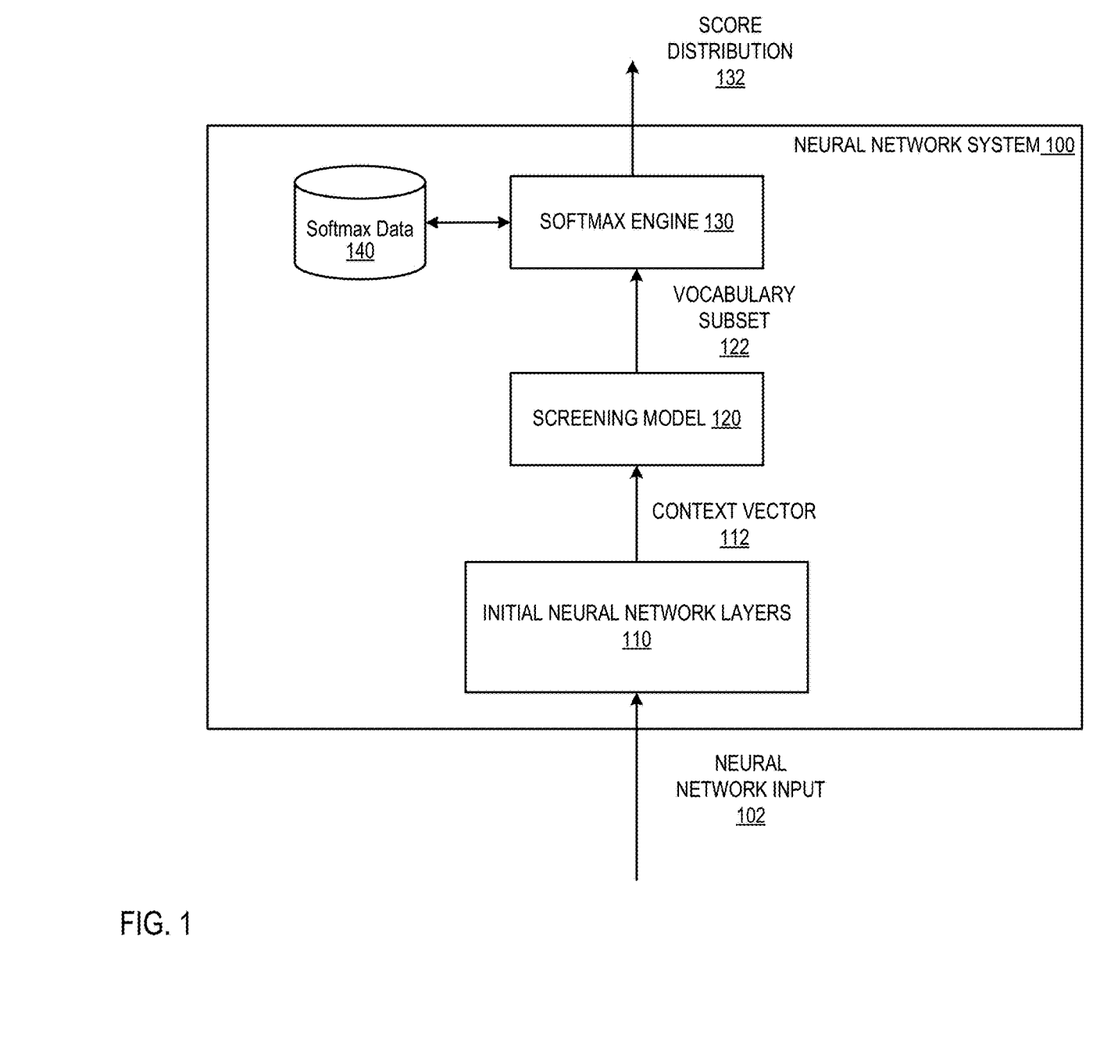
FIG. 1 shows an example neural network system.

FIG. 1 shows an example neural network system 100. The neural network system 100 is an example of a system implemented as computer programs on one or more computers in one or more locations in which the systems, components, and techniques described below are implemented.

This neural network system 100 implements a neural network that replaces a conventional softmax output layer with an accurate approximation of the softmax layer that can be computed using much less computation and in much less time. This greatly decreases the time required for the system 100 to compute a neural network inference for a given input relative to conventional systems.

The neural network that is implemented by the system 100 is configured to receive a neural network input 102 and to generate a score distribution 132 over a vocabulary of possible neural network outputs for the neural network input 102. As described above, which outputs are in the vocabulary of possible neural networks output is dependent on the task that the neural network is configured to perform.

Generally, the described techniques are applicable to any machine learning task that has a large vocabulary of possible outputs, e.g., tasks that have an output vocabulary of words in a target natural language or classification tasks that have an output vocabulary over a very large number of possible classes. As described below, when the size of the vocabulary is large and the neural network needs to produce a probability distribution over the outputs in order to generate a network output, neural network inference times are bottlenecked by the computations of the softmax layer.

Once the score distribution 132 has been generated, the system 100 can provide, e.g., for presentation to a user or to another system, the score distribution 132 as the network output of the system or can select one or more of the possible outputs that have the highest scores and provide the one or more possible network outputs as the network output of the system (optionally along with the corresponding scores). Alternatively, the system 100 can store the score distribution 132 or the one or more possible outputs with highest scores in association with the network input 102 for later use.

The neural network implemented by the system 100 includes one or more initial neural network layers 110 and components that replace a softmax layer that was trained jointly with the neural network layers 110: a screening model 120, a softmax engine 130, and softmax data 140.

As above, which initial neural network layers 110 are part of the neural network is dependent on the task. For example, for sequence processing tasks, the layers can include one or more of recurrent layers, e.g. (long short-term memory) LSTM layers, feed-forward layers, self-attention layers, or convolutional layers. For image classification tasks, the layers can be a convolutional neural network that generates a context vector from the input image.

In particular, the system 100 maintains softmax data 140 specifying a respective softmax weight vector and optionally a respective bias value for each output in a vocabulary of possible neural network outputs. The softmax data 140 was generated as a result of the training of the neural network, i.e., with the one or more initial neural network layers 140 and a conventional softmax output layer. That is, the weight vectors and bias values in the softmax data 140 are the trained parameter values of a conventional softmax output layer that were determined by training the conventional softmax layer jointly with the one or more initial neural network layers 140.

To compute an inference, the system 100 receives the neural network input 102 and processes the neural network input 102 using the one or more initial neural network layers 110 to generate a context vector 112 for the neural network input 102. The context vector 112 will generally be the output of the last initial neural network layer or a combination of outputs from multiple initial neural network layers, e.g., if the neural network includes skip connections.

The system 100 then generates an approximate softmax score distribution over the vocabulary of possible neural network outputs for the neural network input 102, i.e., instead of generating an actual softmax score distribution by processing the context vector through a conventional softmax layer.

In particular, if the system 100 were to implement a conventional softmax layer, the system would generate a respective logit for each possible output in the vocabulary by applying the softmax weight vector for the possible output, i.e., by computing an inner product between the context vector and the softmax weight vector, to the context vector (and then optionally applying the bias value for the output). When the vocabulary contains a large number of outputs, this requires computing a very large number of inner products, which is both computationally and time intensive. In some cases, i.e., when the scores are required to be probabilities, the system would then normalize the logits to generate a respective probability for each output that is in the proper subset. This normalization is also relatively computationally and time intensive because a respective normalization factor would need to be computed for each of the logits.

Instead, to generate the approximate distribution, the system 100 processes the context vector 112 using a screening model 120.

The screening model 120 is configured to predict a proper subset, i.e., less than all, of the vocabulary for the context input. That is, the screening model 120 identifies a vocabulary subset 122 that includes less than all of the possible outputs in the vocabulary.

The screening model 120 generally includes, for each cluster in a set of clusters, a respective parameter vector for each of the plurality of clusters and a candidate proper output subset for each cluster. The candidate proper output subset for a cluster is a proper subset of the outputs in the vocabulary of outputs that has been assigned to the cluster.

To predict the proper subset for the context input, the system 100 clusters the context vector 112 into a particular cluster of the plurality of clusters using the parameter vectors and then assigns the proper subset for the context vector 112 to be the candidate proper output subset for the particular cluster.

To cluster the context vector 112, the system 100 determines, for each cluster, an inner product between the context vector and the parameter vector for the cluster and clusters the context vector 112 into the cluster with the highest inner product.

Predicting a proper subset of the vocabulary for the context input 112 is described in more detail below with reference to FIGS. 2 and 3.

Training the context model 120 to determine the parameter vectors for the clusters and the candidate proper subsets for the clusters is described in more detail below with reference to FIG. 4.

The softmax engine 130 then generates the score distribution 132 using the softmax data 140 and the vocabulary subset 122.

In particular, the softmax engine 130 generates a respective logit for each output that is in the vocabulary subset 122 by applying the softmax weight vector for the output to the context vector and then optionally applying the bias value for the output. In some cases, the softmax engine 130 uses these logits as the scores in the score distribution, with each output that is not in the proper subset having a score of zero.

In other cases, the softmax engine 130 normalizes the logits to generate a respective probability for each output that is in the proper subset. The system 130 then generates a probability distribution that assigns the respective probability for each output that is in the proper subset and a zero probability to each output that is not in the proper subset.

Each proper subset is generally small relative to the whole vocabulary. Thus, to compute the approximate distribution, the system 100 only needs to perform a small number of inner products instead of computing a different inner product for each output in the vocabulary, as would be required for a conventional softmax layer.

For example, when the vocabulary includes 10,000 possible outputs (like for the "PTB" tasks referenced below with reference to FIG. 5), the average cluster size and thus the average size of the proper subset can be on the order of 100 outputs or 50 outputs while still maintaining high task performance. Thus, the system will only need to compute on average 50 or 100 inner products instead of 10,000 for each prediction, greatly reducing the time and computational resources required to generate a prediction.

For example, when the vocabulary approximately 25,000 possible outputs (like for the "NMT" task referenced below with reference to FIG. 5), the average cluster size and thus the average size of the proper subset can be on the order of 250 outputs or 125 outputs while still maintaining high task performance. Thus, the system will only need to compute on average 125 or 250 inner products instead of 25,000 for each prediction, greatly reducing the time and computational resources required to generate a prediction.

Figure 2:
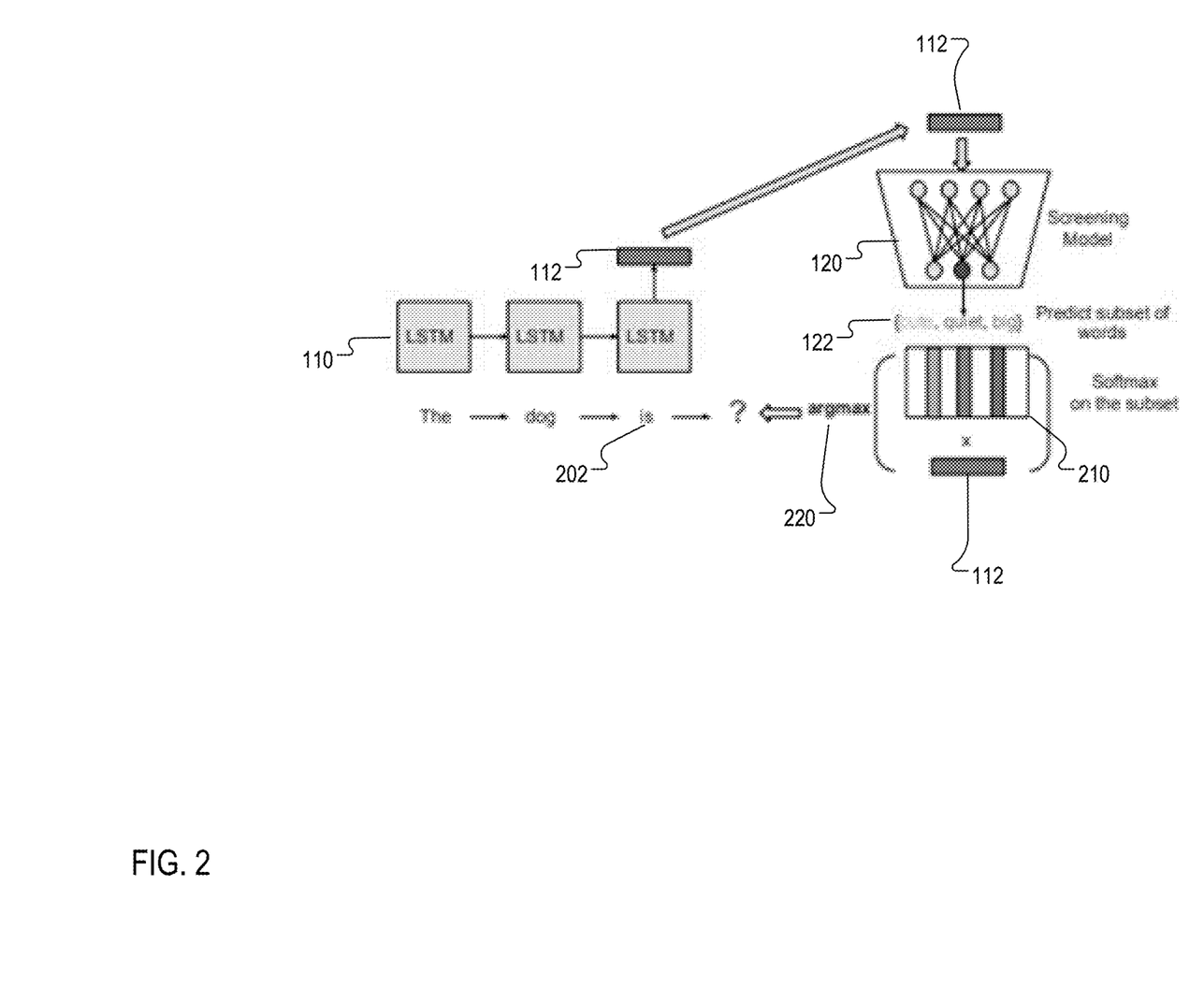
FIG. 2 shows an example of generating a network output using a screening model.

FIG. 2 shows an example of generating a neural network output using a screening model 120. In the example of FIG. 2, the system 100 is performing a language modelling task that requires the system 100 to predict the next word given a sequence of words. Thus, the system needs to generate a probability distribution over a vocabulary of words in the English language.

In particular, in the example of FIG. 2, the system 100 has received a current sequence "The dog is" 202 and needs to predict the word that follows "is" in the sequence.

To make the prediction, the system 100 processes the sequence 202 using the initial neural network layers 110 to generate a context vector 112. In the example of FIG. 2, the initial neural network layers 110 are LSTM layers.

The system 100 then processes the context vector 112 using the screening model 120 to generate the vocabulary subset 122, i.e., to predict a proper subset of the words in the output vocabulary. In the example of FIG. 2, the proper subset of words contains the three words "cute," "quiet," and "big".

The system 100 then computes a respective logit for each word in the subset by computing respective inner products between softmax weight vectors 210 for the words in the subset and the context vector 112 (and optionally adding a respective bias value to each logit).

In the example of FIG. 2, the system then computes an argmax 220 of the logits to select the word that is predicted to follow the word "is" in the input sequence 202. In other cases, the system can normalize the logits to generate a probability distribution as described above with reference to FIG. 1 or simply provide the words with the top k logits and, optionally, the logits themselves as the network output of the system.

As can be seen from FIG. 2, even though a vocabulary of words in the English language will generally include a very large number of words, the system 100 only needs to perform inner products for a very small fraction of the words in the vocabulary to generate prediction by making use of the screening model 120. Because the screening model is used to generate the proper subset, the system can achieve this resource savings with only a minimal reduction in prediction quality.

Figure 3:
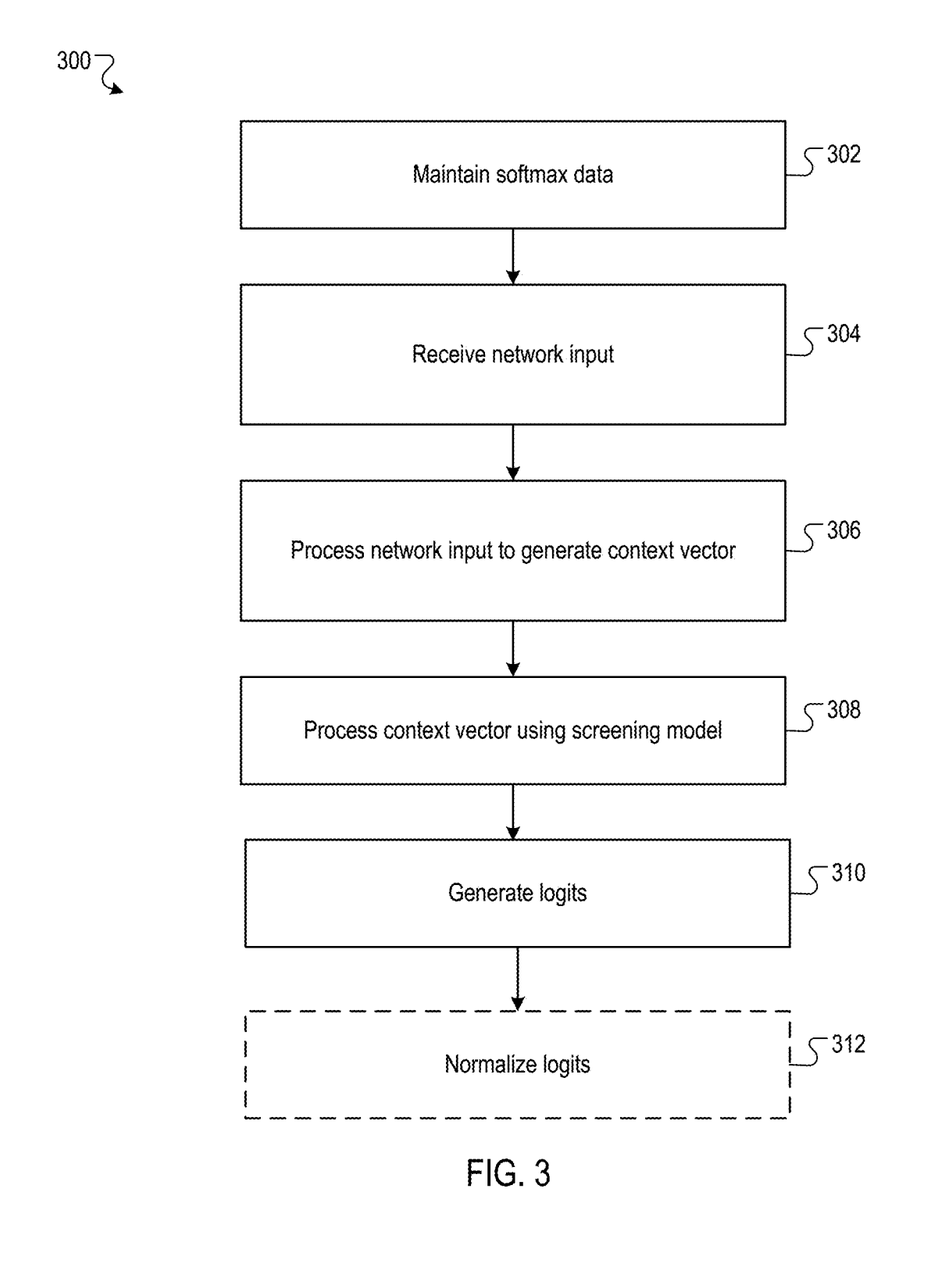
FIG. 3 is a flow diagram of an example process for generating a score distribution for a neural network input.

FIG. 3 is a flow diagram of an example process 300 for generating a score distribution for neural network input. For convenience, the process 300 will be described as being performed by a system of one or more computers located in one or more locations. For example, a neural network system, e.g., the neural network system 100 of FIG. 1, appropriately programmed, can perform the process 300.

The system maintains softmax data that includes a respective softmax weight vector for each possible output in a vocabulary of possible outputs (step 302). The softmax data can also optionally include a respective bias value for each of the possible outputs.

The system receives a neural network input (step 304).

The system then generates an approximate score distribution over the vocabulary of possible neural network outputs for the neural network input.

In particular, the system processes the context vector using a screening model that is configured to predict a proper subset of the vocabulary for the context input (step 306).

The screening model generally includes, for each cluster in a set of clusters, a respective parameter vector for each of the plurality of clusters and a candidate proper output subset for each cluster. To predict the proper subset for the context input, the system clusters the context vector into a particular cluster of the plurality of clusters using the parameter vectors and then assigns the proper subset for the context vector to be the candidate proper output subset for the particular cluster. To cluster the context vector, the system determines, for each cluster, an inner product between the context vector and the parameter vector for the cluster and clusters the context vector into the cluster with the highest inner product.

The system then generates a respective logit for each output that is in the proper subset by applying the softmax weight vector for the output to the context vector (step 308).

In some cases, the system uses logits as the scores in the approximate score distribution, i.e., by assigning a score of zero to the outputs that are not in the proper subset.

In some other cases, the system normalizes the logits to generate a respective probability for each output that is in the proper subset to generate an approximate softmax probability distribution (step 310). That is, the approximate softmax probability distribution includes the generated probability for each output that is in the proper subset and a zero probability for each output that is not in the proper subset.

Figure 4:
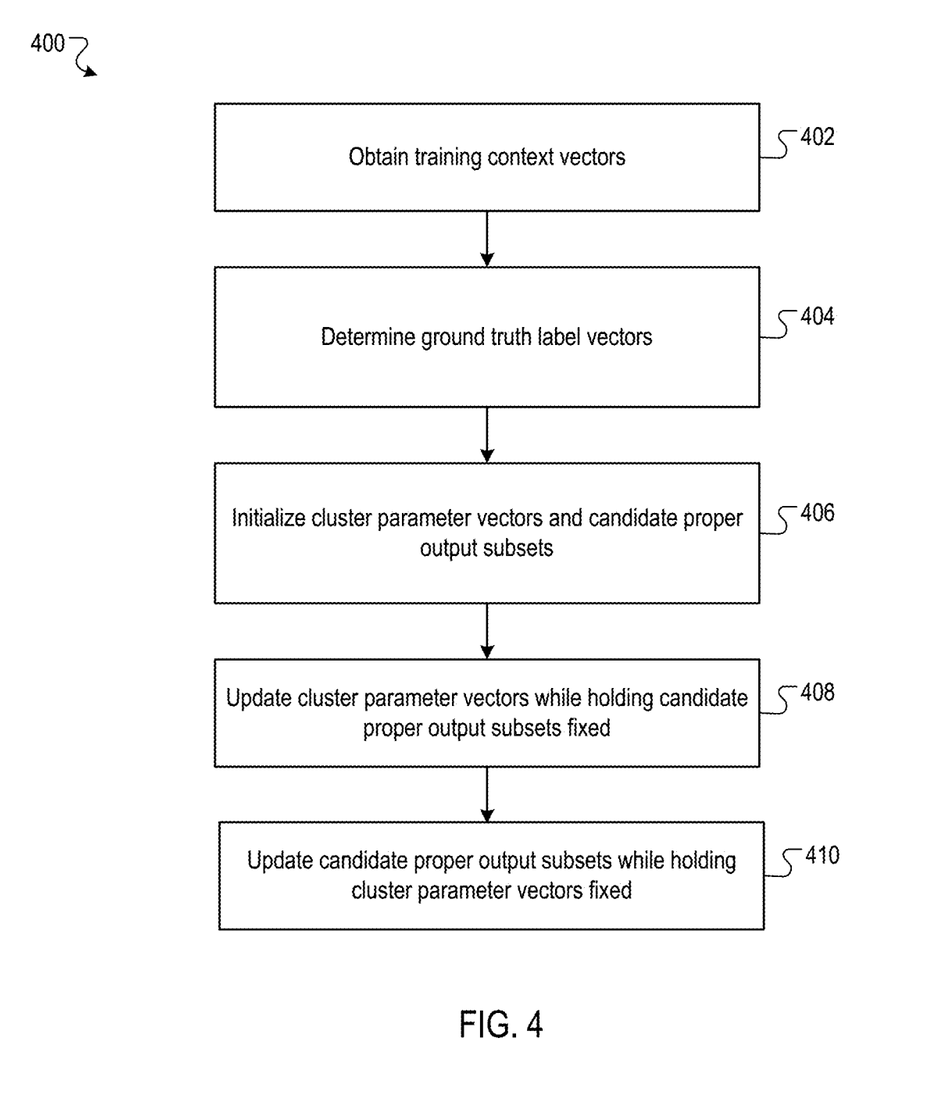
FIG. 4 is a flow diagram of an example process for training the screening model.

FIG. 4 is a flow diagram of an example process 400 for training the screening model. For convenience, the process 400 will be described as being performed by a system of one or more computers located in one or more locations. For example, a neural network system, e.g., the neural network system 100 of FIG. 1, appropriately programmed, can perform the process 400.

The system receives a plurality of training context vectors (step 402). For example, the training context vectors may be context vectors generated by the trained initial neural network layers for some or all of the training inputs used in training the neural network.

The system generates a respective ground truth label vector for each training context input by processing the training context vector through a softmax layer (step 404). That is, the system processes the training context vector using a conventional ("full") softmax layer that computes inner products between the training context vector and each softmax weight vector to generate a respective logit for each output in the vocabulary. The system then generates a ground truth label vector that includes a respective value for each output in the vocabulary. For each possible output that has a logit that is in the top k highest logits as generated by the conventional softmax layer, the system sets the value for the possible output in the ground truth label vector to one. For each possible output that has a logit that is not in the top k highest logits, the system sets the value for the logit to zero. The value of k can be a predetermined value that is a very small fraction of the total number of outputs in the vocabulary, e.g., k can be equal to one, three, five, or ten.

The system initializes the cluster parameter vectors and the candidate proper output subsets for each cluster (step 406). For example, the system can initialize each candidate proper output subset to be the empty set, i.e., so that initially no outputs are assigned to any of the clusters. The system can initialize the clustering parameters using a conventional clustering technique, e.g., spherical kmeans, over the training context vectors.

The system then trains the screening model to determine trained values of the cluster parameter vectors and final candidate proper output subsets for each cluster. In particular, the system trains the screening model to minimize an objective function that measures a mismatch between the ground truth label vectors and the proper subsets for which logits are generated by the system using the process 300 and using the current screening model. In particular, the objective penalizes the screening model when (i) a possible output is assigned a value of one by the ground truth label but is not in the proper subset for which logits are generated and (ii) a possible output is not assigned a value of one but is in the proper subset. In particular, (i) is penalized because a potentially decrease in prediction accuracy is incurred due to not generating a logit for a high-scoring possible output while (ii) is penalized because an inner product is computed for an irrelevant possible output, i.e., computational resources are wasted computing an inner product for an output that should not be in the proper subset.

As a particular example, the system can minimize the following objective function:

$$\underset{\substack{v_1, \ldots, v_r \\ c_1, \ldots, c_r}}{\text{minimize}} \sum_{i=1}^{N} \left( \sum_{s: y_{is}=1} (1 - c_{\bar{p}(h_i), s})^2 + \lambda \sum_{s: y_{is}=0} (c_{\bar{p}(h_i), s})^2 \right)$$

$$\text{s.t.} \quad c_t \in \{0, 1\}^L \forall t = 1, \ldots, r$$

$$\bar{L} \leq B \forall i = 1, \ldots, N$$

where the minimization is over values of the cluster parameter vectors v and the candidate proper output subsets c for each cluster, r is the total number of clusters, N is the total number of training context vectors, $h_i$ is the i-th training context vector, $y_{is}$ is the value for output s in the ground truth label vector for the i-th training context vector, L is the total number of possible outputs in the vocabulary, $\lambda$ is a predetermined weight value, B is a constant value that represents a desired average number of outputs in each cluster, $\bar{L}$ is the average number of outputs in each cluster given the current values of the candidate cluster sets for each cluster, $\bar{p}(h_i)$ is the output that is assigned the value one in a differentiable one-hot representation of the argmax of the scores generated by the approximate softmax using the current values of the cluster parameter vectors and the candidate proper output subsets, and $c_{ds}$ is one when the output s is in the proper output subset for the cluster d and zero when the output s is not in the proper output subset for the cluster d. The differentiable one-hot representation can be generated by re-parameterizing the argmax using the Gumbel trick.

The system can optimize this objective function by repeatedly alternating between performing steps 408 and 410.

In step 408, the system updates the cluster parameter vectors while holding the candidate proper output subsets fixed. In particular, to perform this update, the system can convert the cluster size constraint into a term of the objective function and then update the following objective function using stochastic gradient descent:

$$\underset{v_1,\ldots,v_r}{\text{minimize}} \sum_{i=1}^{N} \left( \sum_{j: y_{is}=1} (1 - c_{\bar{p}(h_i),s})^2 + \lambda \sum_{s: y_{is}=0} (c_{\bar{p}(h_i),s})^2 \right) + \gamma \max(0, \vec{L} - B)$$

$$\text{s.t.} \quad c_t \in \{0,1\}^L \forall\, t = 1, \ldots, r,$$

The system is able to backpropagate through this objective function to update the cluster parameter vectors using stochastic gradient descent because of the use of the differentiable one hot representation of the argmax of the scores generated by the approximate softmax using the current values of the cluster parameter vectors and the candidate proper output subsets, i.e., because of the use of the "Gumbel trick."

In step 410, the system updates the candidate proper output subsets while holding the cluster parameter vectors fixed. In particular, the system can solve a Knapsack problem to compute the updated candidate proper output subset. More specifically, the system treat each $c_{t,s}$ as an item, with weight proportional to the number of outputs belonging to this cluster, and value defined by the objective function being minimized, with the goal beings to maximize the value within weight capacity B. The system can apply a greedy approach to solve this problem, i.e., to determine the updated candidate proper output subsets, by sorting items by the value-capacity ratio and adding them one-by-one until reaching the upper capacity B.

Training the screening model in this manner allows the system to take into account not only similarities between context vectors but also the predicted output space for context vectors into account when assigning a proper subset to a context vector using the trained screening model.

Figure 5:
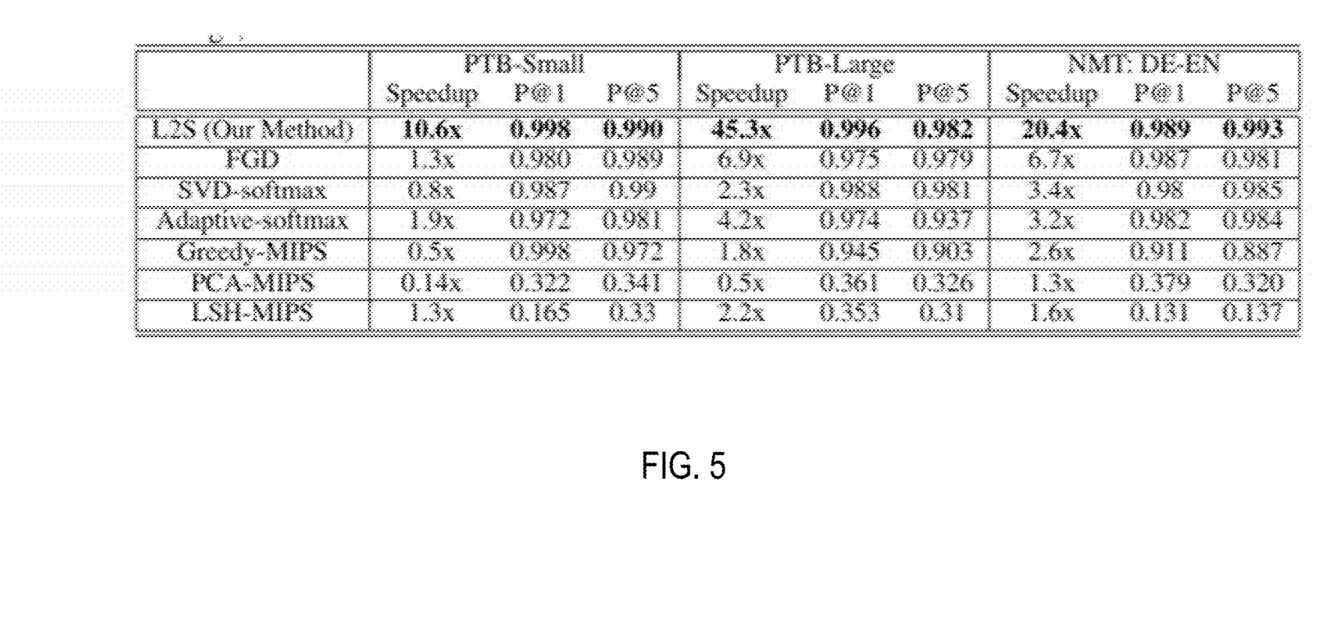
FIG. 5 shows the performance of the claimed technique relative to other, conventional techniques for decreasing the inference time of neural networks with softmax output layers.

FIG. 5 shows the performance of the claimed technique relative other, conventional techniques for decreasing the inference time of neural networks with softmax output layers. As can be seen from FIG. 5, the "L2S" technique that is described in this application offers greater speed ups (where a higher number means a greater reduction in inference time) while maintaining higher performance (where the charts show top 1 and top 5 accuracy and a higher number indicates better performance) relative to these other techniques on three different tasks: PTB-Small and PTB-large (language modelling tasks with different context vector dimensions) and NMT (a machine translation task).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
maintaining data specifying a respective softmax weight vector for each output in a vocabulary of possible neural network outputs;
receiving a neural network input;
processing the neural network input using one or more initial neural network layers to generate a context vector for the neural network input; and
generating an approximate score distribution over the vocabulary of possible neural network outputs for the neural network input, comprising:
processing the context vector using a screening model configured to predict a proper subset of the vocabulary for the context input; and
generating a respective logit for each output that is in the proper subset, comprising applying the softmax weight vector for the output to the context vector.

2. The method of claim 1, wherein the approximate score distribution is an approximate softmax probability distribution and wherein generating the approximate score distribution comprises:
normalizing the logits to generate a respective probability for each output that is in the proper subset to generate the approximate softmax probability distribution.

3. The method of claim 1 wherein generating a respective logit for each output that is in the proper subset comprises:
only computing logits for outputs that are in the proper subset.

4. The method of claim 1, wherein the maintained data further comprises a respective bias value for each output in the vocabulary, and wherein generating a respective logit for each output that is in the proper subset further comprises adding the bias value for the output to the result of applying the softmax weight vector to the context vector.

5. The method of claim 1 further comprising:
generating a neural network output for the neural network input from the approximate score distribution.

6. The method of claim 5, wherein the neural network output identifies the k outputs from the vocabulary of outputs that have the have the highest scores in the approximate score distribution, wherein k is an integer greater than or equal to one.

7. The method of claim 1,
wherein the screening model comprises a respective parameter vector for each of a plurality of clusters and a candidate proper output subset for each cluster, and
wherein processing the context vector using a screening model configured to predict a proper subset of the vocabulary for the context input comprises:
clustering the context vector into a particular cluster of the plurality of clusters using the parameter vectors; and
predicting the proper subset for the context vector to be the candidate proper output subset for the particular cluster.

8. The method of claim 7, wherein clustering the context vector comprises:
for each cluster, determining an inner product between the context vector and the parameter vector for the cluster; and
clustering the context vector into the cluster with the highest inner product.

9. A system comprising one or more computers and one or more storage devices storing instructions that when executed by the one or more computers cause the one or more computers to perform operations comprising:
maintaining data specifying a respective softmax weight vector for each output in a vocabulary of possible neural network outputs;
receiving a neural network input;
processing the neural network input using one or more initial neural network layers to generate a context vector for the neural network input; and
generating an approximate score distribution over the vocabulary of possible neural network outputs for the neural network input, comprising:
processing the context vector using a screening model configured to predict a proper subset of the vocabulary for the context input; and
generating a respective logit for each output that is in the proper subset, comprising applying the softmax weight vector for the output to the context vector.

10. The system of claim 9, wherein the approximate score distribution is an approximate softmax probability distribution and wherein generating the approximate score distribution comprises:
normalizing the logits to generate a respective probability for each output that is in the proper subset to generate the approximate softmax probability distribution.

11. The system of claim 9 wherein generating a respective logit for each output that is in the proper subset comprises:
only computing logits for outputs that are in the proper subset.

12. The system of claim 9, wherein the maintained data further comprises a respective bias value for each output in the vocabulary, and wherein generating a respective logit for each output that is in the proper subset further comprises adding the bias value for the output to the result of applying the softmax weight vector to the context vector.

13. The system of claim 9 the operations further comprising:
generating a neural network output for the neural network input from the approximate score distribution.

14. The system of claim 13, wherein the neural network output identifies the k outputs from the vocabulary of outputs that have the have the highest scores in the approximate score distribution, wherein k is an integer greater than or equal to one.

15. The system of claim 9,
wherein the screening model comprises a respective parameter vector for each of a plurality of clusters and a candidate proper output subset for each cluster, and
wherein processing the context vector using a screening model configured to predict a proper subset of the vocabulary for the context input comprises:
clustering the context vector into a particular cluster of the plurality of clusters using the parameter vectors; and
predicting the proper subset for the context vector to be the candidate proper output subset for the particular cluster.

16. The system of claim 15, wherein clustering the context vector comprises:
for each cluster, determining an inner product between the context vector and the parameter vector for the cluster; and
clustering the context vector into the cluster with the highest inner product.

17. One or more non-transitory computer-readable storage media storing instructions that when executed by one or more computers cause the one or more computers to perform operations comprising:

maintaining data specifying a respective softmax weight vector for each output in a vocabulary of possible neural network outputs;

receiving a neural network input;

processing the neural network input using one or more initial neural network layers to generate a context vector for the neural network input; and generating an approximate score distribution over the vocabulary of possible neural network outputs for the neural network input, comprising:

processing the context vector using a screening model configured to predict a proper subset of the vocabulary for the context input; and generating a respective logit for each output that is in the proper subset, comprising applying the softmax weight vector for the output to the context vector.

18. The computer-readable storage media of claim 17 wherein generating a respective logit for each output that is in the proper subset comprises:

only computing logits for outputs that are in the proper subset.

19. The computer-readable storage media of claim 17, wherein the screening model comprises a respective parameter vector for each of a plurality of clusters and a candidate proper output subset for each cluster, and wherein processing the context vector using a screening model configured to predict a proper subset of the vocabulary for the context input comprises:

clustering the context vector into a particular cluster of the plurality of clusters using the parameter vectors; and predicting the proper subset for the context vector to be the candidate proper output subset for the particular cluster.

20. The computer-readable storage media of claim 19, wherein clustering the context vector comprises:

for each cluster, determining an inner product between the context vector and the parameter vector for the cluster; and clustering the context vector into the cluster with the highest inner product.

* * * * *